(12) United States Patent
Aoki

(10) Patent No.: US 7,806,201 B2
(45) Date of Patent: Oct. 5, 2010

(54) POWER TOOL WITH DYNAMIC VIBRATION DAMPING

(75) Inventor: Yonosuke Aoki, Anjo (JP)

(73) Assignee: Makita Corporation, Anjo-shi (JP)

( * ) Notice: Subject to any disclaimer, the term of this patent is extended or adjusted under 35 U.S.C. 154(b) by 114 days.

(21) Appl. No.: 12/219,130

(22) Filed: Jul. 16, 2008

(65) Prior Publication Data

US 2009/0025949 A1 Jan. 29, 2009

(30) Foreign Application Priority Data

Jul. 24, 2007 (JP) ............................. 2007-191683
Feb. 21, 2008 (JP) ............................. 2008-040725

(51) Int. Cl.
*B25D 17/24* (2006.01)
(52) U.S. Cl. ...................... 173/210; 173/162.2; 173/47; 173/48; 173/211
(58) Field of Classification Search ................. 173/210, 173/211, 162.1, 162.2, 48, 47
See application file for complete search history.

(56) References Cited

U.S. PATENT DOCUMENTS

| | | | |
|---|---|---|---|
| 2,016,207 A | | 10/1935 | Lindenberg |
| 2,875,731 A | | 3/1959 | Settles et al. |
| 3,661,216 A | * | 5/1972 | Yamanaka .................... 173/17 |
| 3,735,824 A | * | 5/1973 | Astrom ........................ 175/213 |
| 3,788,404 A | * | 1/1974 | Koudelka et al. ........... 173/211 |
| 3,920,086 A | * | 11/1975 | Goppen et al. .............. 173/206 |
| 4,014,392 A | * | 3/1977 | Ross ............................ 173/118 |
| 4,071,094 A | * | 1/1978 | Kilin et al. ................... 173/211 |
| 4,226,021 A | * | 10/1980 | Hoff ............................. 30/276 |
| 4,340,210 A | * | 7/1982 | Townsend .................... 267/137 |
| 4,388,972 A | * | 6/1983 | Gidlund .................... 173/162.1 |
| 4,446,931 A | * | 5/1984 | Bleicher et al. ................ 173/48 |
| 4,487,272 A | * | 12/1984 | Bleicher et al. ................ 173/48 |
| 4,648,468 A | * | 3/1987 | Honsa ........................ 173/210 |
| 4,711,308 A | * | 12/1987 | Blaas et al. ............... 173/162.2 |
| 4,723,610 A | * | 2/1988 | Dummermuth et al. ........ 173/1 |

(Continued)

FOREIGN PATENT DOCUMENTS

DE 878 737 C 6/1953

(Continued)

OTHER PUBLICATIONS

European Search Report issued Apr. 21, 2010 in European Patent Application No. 08 01 3032.

*Primary Examiner*—Brian D Nash
(74) *Attorney, Agent, or Firm*—Oliff & Berridge, PLC

(57) ABSTRACT

It is an object of the invention to provide a technique that contributes to improvement of the vibration reducing performance of a dynamic vibration reducer in a power tool while realizing reduction in size of the dynamic vibration reducer. A representative power tool which linearly drives a tool bit to perform a predetermined operation on a workpiece includes a tool body and a dynamic vibration reducer. The dynamic vibration reducer has a weight and an elastic element. The weight has an internal space that extends in the axial direction of the tool bit from at least one end of the weight in said axial direction. One end of the elastic element is inserted and received in the internal space, while the other end of the elastic element is placed on the tool body directly or via the body side member.

10 Claims, 10 Drawing Sheets

U.S. PATENT DOCUMENTS

| | | | |
|---|---|---|---|
| 4,771,833 A * | 9/1988 | Honsa | 173/162.2 |
| 4,776,408 A * | 10/1988 | Elkin et al. | 173/211 |
| 4,895,212 A * | 1/1990 | Wache | 173/48 |
| 5,054,562 A * | 10/1991 | Honsa et al. | 173/210 |
| 5,692,574 A * | 12/1997 | Terada | 173/162.2 |
| 5,697,456 A * | 12/1997 | Radle et al. | 173/162.2 |
| 5,871,059 A * | 2/1999 | Shibata et al. | 173/211 |
| 6,076,616 A * | 6/2000 | Kramp et al. | 173/162.2 |
| 6,161,256 A * | 12/2000 | Quiring et al. | 16/431 |
| 6,161,628 A * | 12/2000 | Liu | 173/168 |
| 6,308,378 B1 * | 10/2001 | Mooty et al. | 16/430 |
| 6,776,245 B2 * | 8/2004 | Kristen et al. | 173/217 |
| 7,076,838 B2 * | 7/2006 | Meixner | 16/431 |
| 7,252,157 B2 * | 8/2007 | Aoki | 173/162.2 |
| 7,383,895 B2 * | 6/2008 | Aoki | 173/201 |
| 7,410,009 B2 * | 8/2008 | Hirayama et al. | 173/201 |
| 7,469,752 B2 * | 12/2008 | Furusawa et al. | 173/48 |
| 7,523,791 B2 * | 4/2009 | Aoki | 173/210 |
| 7,712,548 B2 | 5/2010 | Moessnang | |
| 2004/0094315 A1 * | 5/2004 | Chang | 173/210 |
| 2004/0206520 A1 * | 10/2004 | Ikuta | 173/48 |
| 2005/0087353 A1 * | 4/2005 | Oki et al. | 173/162.2 |
| 2005/0247464 A1 * | 11/2005 | Hellbach et al. | 173/162.2 |
| 2006/0076154 A1 * | 4/2006 | Aoki | 173/212 |
| 2006/0272836 A1 * | 12/2006 | Hirayama et al. | 173/109 |
| 2007/0039749 A1 * | 2/2007 | Aoki | 173/201 |
| 2007/0125563 A1 * | 6/2007 | Furusawa et al. | 173/48 |
| 2007/0175647 A1 * | 8/2007 | Aoki | 173/210 |
| 2008/0029282 A1 * | 2/2008 | Ikuta | 173/114 |
| 2008/0047723 A1 * | 2/2008 | Kamegai et al. | 173/109 |
| 2008/0179797 A1 | 7/2008 | Manschitz et al. | |
| 2008/0210451 A1 * | 9/2008 | Aoki | 173/211 |
| 2008/0283264 A1 * | 11/2008 | Ikuta et al. | 173/211 |
| 2008/0308287 A1 * | 12/2008 | Sugiyama et al. | 173/211 |
| 2009/0032275 A1 * | 2/2009 | Ikuta et al. | 173/117 |

FOREIGN PATENT DOCUMENTS

| | | |
|---|---|---|
| DE | 295 05 125 U1 | 6/1995 |
| EP | 1 618 999 A1 | 1/2006 |
| EP | 1 736 283 A2 | 12/2006 |
| EP | 1 952 950 A2 | 8/2008 |
| EP | 1 952 952 A2 | 8/2008 |
| JP | A-52-109673 | 9/1977 |
| JP | A-57-140942 | 8/1982 |
| JP | A-2004-154903 | 6/2004 |
| WO | WO 03/018342 A2 | 3/2003 |

* cited by examiner

POWER TOOL WITH DYNAMIC VIBRATION DAMPING

BACKGROUND OF THE INVENTION

1. Field of the Invention

The present invention relates to a vibration reducing technique of a power tool, such as a hammer and a hammer drill, which linearly drives a tool bit.

2. Description of the Related Art

Japanese non-examined laid-open Patent Publication No. 2004-154903 discloses an electric hammer having a vibration reducing mechanism. This known electric hammer has a dynamic vibration reducer as a means for reducing vibration caused in the axial direction of the hammer bit during hammering operation. The dynamic vibration reducer has a weight that can linearly move under a biasing force of an elastic element, and the dynamic vibration reducer reduces vibration of the hammer during hammering operation by the movement of the weight in the axial direction of the tool bit.

In the known dynamic vibration reducer, the weight has a long columnar shape having a large-diameter portion and a small-diameter portion which are integrally connected to each other. Further, a coil spring is disposed on the outer periphery of the small-diameter portion. With this construction, the movement of the weight in the axial direction of the tool bit can be stabilized, while maintaining the mass of the weight.

In order to realize a lower-vibration hammer, it is effective to improve the vibration reducing performance of the dynamic vibration reducer, or to increase the vibration reducing power (power acting in a direction opposite to the direction of vibration) of the dynamic vibration reducer. In the known dynamic vibration reducer, however, the coil spring having a lower density than the weight (due to existence of axial voids between adjacent coil parts) is disposed on the outer peripheral side of the weight. Thus, in terms of ensuring the mass of the weight, it has a poor space utilization efficiency. If the weight is increased in mass with the aim of improving the vibration reducing performance, the dynamic vibration reducer will be increased in size and thus require a larger installation space in the power tool.

SUMMARY OF THE INVENTION

Accordingly, it is an object of the invention to provide a technique that contributes to improvement of the vibration reducing performance of a dynamic vibration reducer in a power tool while reducing the size of the dynamic vibration reducer.

The above-described problem can be solved by a claimed invention. The representative power tool linearly drives a tool bit to perform a predetermined operation on a workpiece. The power tool includes a tool body and a dynamic vibration reducer. The power tool according to the invention may include power tools, such as a hammer, a hammer drill, a jig saw and a reciprocating saw, which perform an operation on a workpiece by linear movement of a tool bit. The dynamic vibration reducer includes a weight that linear moves in an axial direction of the tool bit. The weight is provided on the tool body directly or via a body side member. Further, the dynamic vibration reducer includes an elastic element that elastically supports the weight on the tool body directly or via the tool body side member. The dynamic vibration reducer serves to reduce vibration of the tool body during hammering operation by the linear movement of the weight in the axial direction of the tool bit. Further, the weight has an internal space that extends in the axial direction of the tool bit from at least one end of the weight in the axial direction. One end of the elastic element in the axial direction of the tool bit is inserted and received in the internal space, while the other end is placed on the tool body or the body side member.

According to this invention, with the construction in which the internal space is formed in the weight and extends in the axial direction of the tool bit and the elastic element is inserted and received in the internal space, the weight can be disposed on the outer peripheral side of the elastic element. As a result, compared with a construction in which an elastic element is disposed on the outer peripheral side of the weight, the mass of the weight can be increased. Thus, the vibration reducing performance of the dynamic vibration reducer can be enhanced. Further, with the construction in which the elastic element is disposed in the internal space of the weight, if the elastic element comprises a coil spring, the diameter of the coil spring can be reduced. By reducing the diameter of the coil spring, a smaller stress is generated, so that the coil spring can be provided with a greater spring force while maintaining its durability. As a result, the vibration reducing performance of the dynamic vibration reducer can be further enhanced.

Further, an overlap between the weight and the elastic element in the longitudinal direction of the tool bit can be made longer by the fact that the one end of the elastic element is inserted and received in the internal space of the weight. Thus, the entire dynamic vibration reducer can be reduced in its axial length and thus can be reduced in size.

According to a further embodiment of the present invention, the weight may include a first part and a second part respectively extending in the axial direction of the tool bit, a connecting part that connects the second part to the first part, and a space enclosed by the first and second parts and the connecting part. The Space defines the internal space. Further, the first part and the second part may be formed by separate members. According to such construction, the first part and the second part can be individually manufactured, so that the manufacturing operation of the weight can be made easier.

According to a further embodiment of the present invention, the first part and the second part are formed of different materials.

According to a further embodiment of the present invention, the weight may preferably have a first internal space extending from one end toward the other end of the weight in the axial direction of the tool bit, and a second internal space extending from the other end toward the one end in the axial direction of the tool bit. Further, the first internal space and the second internal space may be arranged to overlap each other when viewed from a direction transverse to the extending direction. According to such a construction, the dynamic vibration reducer can be further reduced in size in the axial direction of the tool bit. As a result, this construction is effective when installation space for the dynamic vibration reducer in the tool body is limited in the longitudinal direction of the body.

According to a further embodiment of the present invention, the power tool may preferably further include a driving motor disposed on the axis of the tool bit within the tool body such that its axis of rotation intersects with the axis of the tool bit, and a driving mechanism part that is disposed within the tool body and serves to convert rotating output of the driving motor into linear motion and drive the tool bit at least linearly in the axial direction. Further, the dynamic vibration reducer and the driving mechanism part may be opposed to each other on opposite sides of the axis of the tool bit. With such a construction, free space may be provided on the lower side of the axis of the tool bit within the tool body and the dynamic vibration reducer may be disposed by utilizing such free space. As a result, the dynamic vibration reducer can be disposed nearer to the axis of the tool bit, so that rational arrangement can be realized. Further, by disposing the dynamic vibration reducer and the driving mechanism part on opposite sides of the axis of the tool bit, the balance of the power tool can be easily achieved in the vertical direction.

According to a further embodiment of the present invention, the elastic element may comprise coil springs having different diameters respectively and/or coaxially disposed radially inward and outward in the internal space of the weight. Thus, with such a construction, the length of the coil springs can be shortened compared with a construction in which a single coil spring is disposed.

According to a further embodiment of the present invention, the weight may have at least three internal spaces which are all disposed on the same plane. With this construction, the points of action of the elastic elements disposed in the internal spaces are located on the same plane. Thus, such a construction is effective in preventing unnecessary vibration from being caused in the dynamic vibration reducer itself by imbalance of couple.

According to the invention, a technique is provided which contributes to improvement of the vibration reducing performance of a dynamic vibration reducer in a power tool while realizing reduction in size of the dynamic vibration reducer. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment of the Invention

Figure 1:
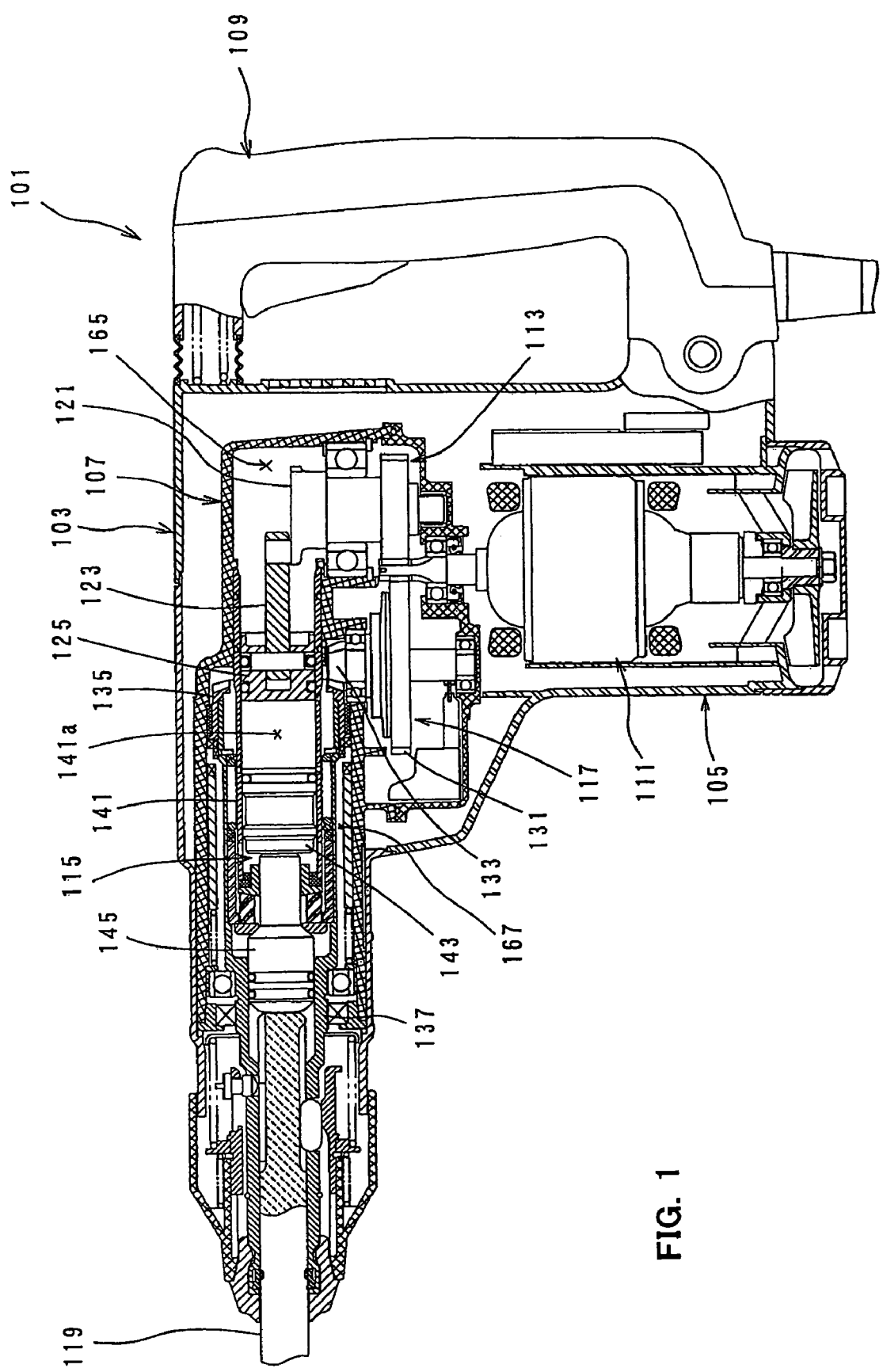
FIG. 1 is a sectional side view schematically showing an entire hammer drill according to a first embodiment of this invention.
Figure 2:
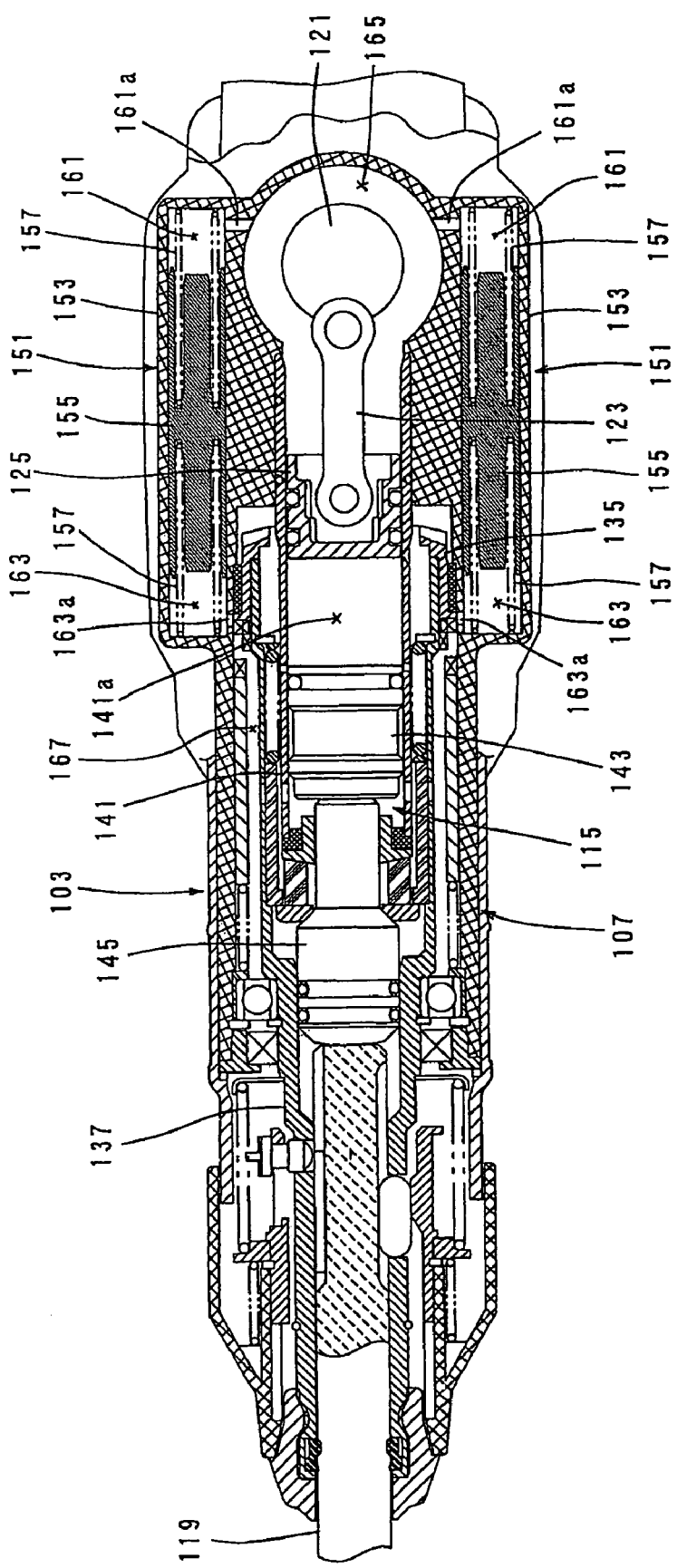
FIG. 2 is a sectional plan view showing an essential part of the hammer drill.
Figure 3:
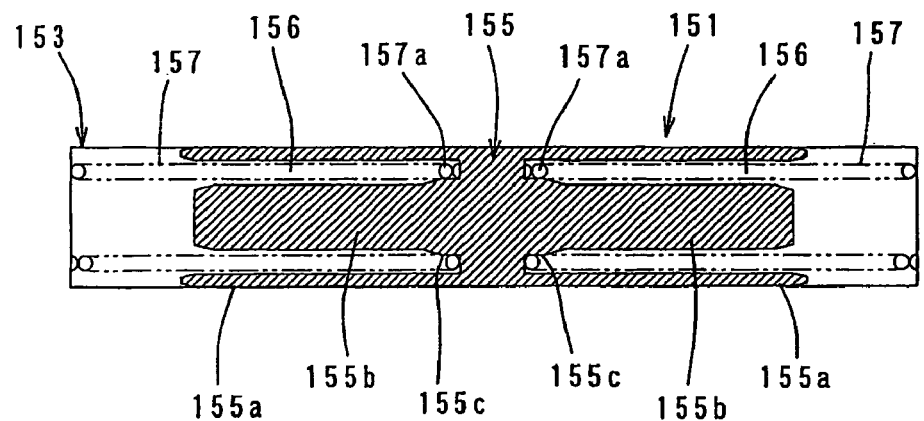
FIG. 3 is a sectional view showing a dynamic vibration reducer.

A first embodiment of the present invention is now described with reference to FIGS. 1 to 3. FIG. 1 is a sectional side view showing an entire electric hammer drill 101 as a representative embodiment of the power tool according to the present invention. FIG. 2 is a sectional plan view showing an essential part of the hammer drill. FIG. 3 is a sectional view of a dynamic vibration reducer.

As shown in FIG. 1, the electric hammer drill 101 of this embodiment includes a body 103 that forms an outer shell of the hammer drill 101, a tool holder 137 connected to the tip end region (on the left side as viewed in FIG. 1) of the body 103 in its longitudinal direction, a hammer bit 119 detachably coupled to the tool holder 137, and a handgrip 109 that is connected to the other end (on the right side as viewed in FIG. 1) of the body 103 and designed to be held by a user. The body 103 and the hammer bit 119 are features that correspond to the "tool body" and the "tool bit", respectively, according to the present invention. The hammer bit 119 is held by the tool holder 137 such that it is allowed to reciprocate with respect to the tool holder 137 in its axial direction (in the longitudinal direction of the body 103) and prevented from rotating with respect to the tool holder 137 in its circumferential direction. For the sake of convenience of explanation, the side of the hammer bit 119 is taken as the front side and the side of the handgrip 109 as the rear side.

The body 103 mainly includes a motor housing 105 that houses a driving motor 111, and a gear housing 107 that houses a motion converting mechanism 113, a striking mechanism 115 and a power transmitting mechanism 117. The rotating output of the driving motor 111 is appropriately converted into linear motion via the motion converting mechanism 113 and transmitted to the striking element 115. As a result, an impact force is generated in the axial direction of the hammer bit 119 via the striking element 115. Further, the speed of the rotating output of the driving motor 111 is appropriately reduced by the power transmitting mechanism 117 and then transmitted to the hammer bit 119 as a rotating force. As a result, the hammer bit 119 is caused to rotate in the circumferential direction.

The motion converting mechanism 113 converts rotation of the driving motor 111 into linear motion and transmits it to the striking element 115. The motion converting mechanism 113 forms a crank mechanism that includes a crank shaft 121 driven by the driving motor 111, a crank arm 127 and a piston 125. The piston 125 forms a driving element that drives the striking element 115 and can slide within a cylinder 141 in the axial direction of the hammer bit 119.

The striking mechanism 115 includes a striking element in the form of a striker 143 that is slidably disposed within the bore of the cylinder 141, and an intermediate element in the form of an impact bolt 145 that is slidably disposed within the tool holder 137 and transmits the kinetic energy of the striker 143 to the hammer bit 119. An air chamber 141a is defined between the piston 125 and the striker 143 within the cylinder 141. The striker 143 is driven via the action of an air spring of the air chamber 141a of the cylinder 141 which is caused by sliding movement of the piston 125. The striker 143 then collides with (strikes) the intermediate element in the form of the impact bolt 145 that is slidably disposed within the tool holder 137, and transmits the striking force to the hammer bit 119 via the impact bolt 145.

The tool holder 137 is rotatable and caused to rotate when the power transmitting mechanism 117 transmits rotation of the driving motor 111 to the tool holder 137 at a reduced speed. The power transmitting mechanism 117 includes an intermediate gear 131 that is rotationally driven by the driving motor 111, a small bevel gear 133 that rotates together with the intermediate gear 131, and a large bevel gear 135 that engages with the small bevel gear 133 and rotates around the longitudinal axis of the body 103. The power transmitting mechanism 117 transmits rotation of the driving motor 111 to the tool holder 137 and further to the hammer bit 119 held by the tool holder 137. The hammer drill 101 can be appropriately switched between a hammer mode in which an operation is performed on a workpiece by applying only a striking force in the axial direction to the hammer bit 119 and a hammer drill mode in which an operation is performed on a workpiece by applying both the striking force in the axial direction and the rotating force in the circumferential direction to the hammer bit 119. This construction is not directly related to the present invention and thus will not be described.

During operation of the hammer drill 101 (when the hammer bit 119 is driven), impulsive and cyclic vibration is caused in the body 103 in the axial direction of the hammer bit. Main vibration of the body 103 which is to be reduced is a compressing reaction force which is produced when the piston 129 and the striker 143 compress air within the air chamber 141a, and a striking reaction force which is produced with a slight time lag behind the compressing reaction force when the striker 143 strikes the hammer bit 119 via the impact bolt 145.

As shown in FIG. 2, the hammer drill 101 has a pair of dynamic vibration reducers 151 in order to reduce the above-mentioned vibration caused in the body 103. The dynamic vibration reducers 151 are disposed on the both sides of the axis of the hammer bit 119 and have the same construction. Each of the dynamic vibration reducers 151 mainly includes a cylindrical body 153 that is circular in section and long in the axial direction of the hammer bit and formed adjacent to the body 103, a vibration reducing weight 155 that is long in the sliding direction and slidably disposed within the cylindrical body 153, and front and rear coil springs 157 disposed on the front and rear sides of the weight 155 in the axial direction of the hammer bit. The cylindrical body 153 and the coil springs 157 are features that correspond to the "body side member" and the "elastic element", respectively, according to the present invention. The coil springs 157 exert respective spring forces on the weight 155 toward each other when the weight 155 moves in the longitudinal direction of the cylindrical body 153 (in the axial direction of the hammer bit).

Further, the cylindrical body 153 is designed and provided as a cylindrical guide that ensures the stability of movement of the weight 155. Although, in this embodiment, the cylindrical body 153 is integrally formed with the body 103 (the gear housing 107), the cylindrical body 153 may be separately formed and removably mounted on the body 103.

The weight 155 and the coil springs 157 serve as vibration reducing elements in the dynamic vibration reducer 151 on the body 103 and cooperate to passively reduce vibration of the body 103 during operation of the hammer drill 101. Thus, the vibration of the body 103 in the hammer drill 101 can be alleviated or reduced.

Further, in this embodiment, the dynamic vibration reducer 151 has a first actuation chamber 161 and a second actuation chamber 163 on the front and rear sides of the weight 155 within the cylindrical body 153. The first actuation chamber 161 on the rear side (on the right side as viewed in FIG. 2) communicates with a hermetic crank chamber 165 that is normally in noncommunication with the outside, via a first communication part 161a. The second actuation chamber 163 on the front side (on the left side as viewed in FIG. 2) communicates with a cylinder receiving space 167 of the gear housing 107 via a second communication part 163a. Pressure within the crank chamber 165 fluctuates when the motion converting mechanism 113 is driven. This is caused by change of the capacity of the crank chamber 165 when the piston 125 of the motion converting mechanism 113 reciprocates within the cylinder 141. The weight 155 of the dynamic vibration reducer 151 is actively driven by introducing the fluctuating pressure of the crank chamber 165 into the first actuation chamber 161 through the first communication part 161a. In this manner, the dynamic vibration reducer 151 performs a vibration reducing function. Specifically, the dynamic vibration reducer 151 not only has the above-mentioned passive vibration reducing function but also serves as an active vibration reducing mechanism by forced vibration in which the weight 155 is actively driven. Thus, vibration caused in the body 103 during hammering operation can be further effectively reduced.

The construction of the dynamic vibration reducer 151 is shown in FIG. 3 in more detail. The weight 155 of the dynamic vibration reducer 151 according to this embodiment is long in the axial direction of the hammer bit and cylindrical and has front and rear spring receiving spaces 156. The spring receiving spaces 156 are annular in section and extend over a predetermined region in the front and rear portions on the both sides of the weight 155 in its longitudinal direction. The spring receiving spaces 156 are features that correspond to the "internal space" according to this invention. The front and rear annular spring receiving spaces 156 extend from the longitudinal end surfaces of the weight 155 along its longitudinal direction (the direction of the length) and terminate generally around the middle of the weight 155. The spring receiving spaces 156 are formed as a space (groove) enclosed by an outer cylindrical portion 155a and an inner columnar portion 155b of the weight 155. Specifically, in this embodiment, the weight 155 having the spring receiving spaces 156 has a one-piece construction having the cylindrical portion 155a and the columnar portion 155b and is formed, for example, by using a mold.

The coil springs 157 are inserted and received in the front and rear spring receiving spaces 156. The end of each of the front and rear coil springs 157 in the direction of insertion is held in contact with the bottom (end) of the associated spring receiving space 156, while the other end is held in contact with the axial end surface of the cylindrical body 153. Thus, the coil springs 157 apply respective biasing forces to the weight 155 toward each other in the longitudinal direction.

Specifically, the weight 155 can move in the axial direction under the respective biasing forces acting toward each other. Further, each of the spring receiving spaces 156 has a width larger than the wire diameter of the coil spring 157. Thus, the coil spring 157 is loosely fitted in the spring receiving space 156 such that the coil spring 157 is kept from contact with the inner surface of the cylindrical portion 155a and the outer surface of the columnar portion 155b. A spring mounting portion 155c having a diameter generally equal to the inner diameter of the coil spring 157 is formed in the columnar portion 155b on the bottom side of the spring receiving space 156. An end coil 157a of the coil spring 157 is fitted on the spring mounting portion 155c. Thus, the coil spring 157 is prevented from moving in the radial direction with respect to the weight 155.

As described above, in the dynamic vibration reducer 151 according to this embodiment, the spring receiving space 156 is formed in the inside of the weight 155 and the coil spring 157 is disposed in the spring receiving space 156. With this construction, the cylindrical portion 155a having a mass with a higher density than the coil spring 157 is disposed on the outer peripheral side of the coil spring 157. Therefore, compared with the known structure in which a coil spring having a lower density than a weight is disposed on the outer peripheral side of the weight, the total mass of the weight 155 and the coil spring 157 provided as vibration reducing elements can be increased, so that the space utilization efficiency is enhanced. As a result, the vibration reducing power of the dynamic vibration reducer 151 can be increased. On the other hand, if the weight 155 and the coil spring 157 are designed to have the same total mass as the known structure, the dynamic vibration reducer 151 can be reduced in size in the radial direction. Further, with the construction in which the cylindrical portion 155a of the weight 155 is disposed on the outer peripheral side of the coil spring 157, the contact length of the weight 155 in the direction of movement or the axial length of the sliding surface of the weight 155 in contact with the inner wall surface of the cylindrical body 153 of the weight 155 can be increased. Thus, stable movement of the weight 155 can be easily ensured.

Further, with the construction in which the coil spring 157 is disposed in the spring receiving space 156 of the weight 155, the outside diameter of the coil spring 157 can be reduced. By reducing the diameter of the coil spring 157, a smaller stress is generated, so that the coil spring 157 can be provided with a greater spring force while maintaining its durability. As a result, the vibration reducing power of the dynamic vibration reducer 151 can be further increased.

Further, by disposing the coil spring 157 in the spring receiving space 156, the coil spring 157 is increased in axial length by the amount of reduction in its outside diameter. However, the dynamic vibration reducer 151 can be reduced in its axial length and thus can be reduced in size, because the contact position of the coil spring 157 with respect to the weight 155 can be situated toward the middle of the weight 155 in the longitudinal direction.

Thus, according to this embodiment, the dynamic vibration reducer 151 can be reduced in size, while having an increased vibration reducing power.

Second Embodiment of the Invention

A second embodiment of the present invention is now described with reference to FIG. 4. The second embodiment is a modification to the construction of the weight 155 in the dynamic vibration reducer 151 and has the same construction as the above-described first embodiment except for the construction of the dynamic vibration reducer 151.

Figure 4:
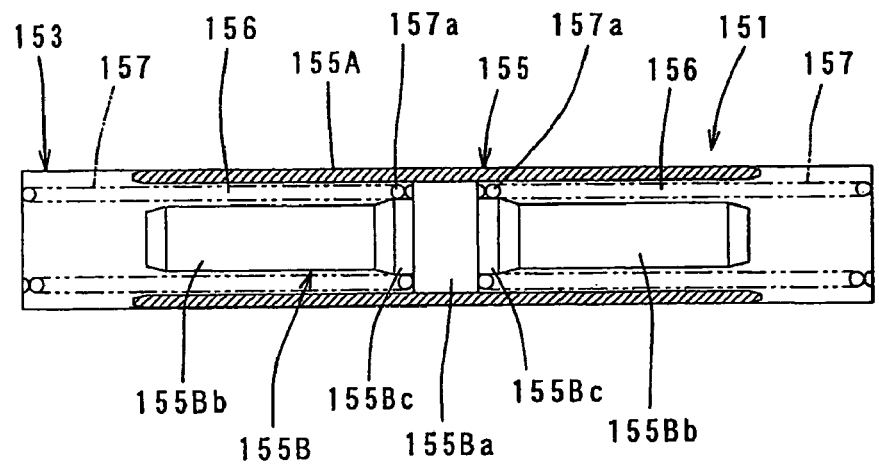
FIG. 4 is a sectional view showing a dynamic vibration reducer according to a second embodiment of this invention.

As shown in FIG. 4, the weight 155 of the dynamic vibration reducer 151 according to this embodiment has an outer cylindrical weight member 155A and an inner columnar weight member 155B which is formed separately from the cylindrical weight member 155A and housed within the cylindrical weight member 155A. The cylindrical weight member 155A and the columnar weight member 155B are features that correspond to the "second part" and the "first part", respectively, according to this invention.

The cylindrical weight member 155A and the columnar weight member 155B have substantially the same axial length. The columnar weight member 155B has a stepped columnar shape having a circular large-diameter portion 155Ba formed in the middle in the axial direction and circular small-diameter portions 155Bb which are integrally connected to the both axial ends of the large-diameter portion 155Ba. The large-diameter portion 155Ba of the columnar weight member 155B is press-fitted into the bore of the cylindrical weight member 155A, so that the columnar weight member 155B is integrally connected to the cylindrical weight member 155A. The large-diameter portion 155Ba press-fitted into the bore of the cylindrical weight member 155A is a feature that corresponds to the "connecting part" according to this invention.

The small-diameter portions 155Bb of the columnar weight member 155B are longer in the axial direction than the large-diameter portion 155Ba. Thus, the front and rear spring receiving spaces 156 each having an annular section and a longer axial length than the large-diameter portion 155Ba are defined between the inner surface of the cylindrical weight member 155A and the outer surface of the small-diameter portions 155Bb of the columnar weight member 155B housed within the cylindrical weight member 155A. The coil springs 157 are inserted and received in the front and rear spring receiving spaces 156. A spring mounting portion 155Bc having a diameter equal to or slightly smaller than the inner diameter of the coil spring 157 is formed in the connection between the large-diameter portion 155Ba and the small-diameter portions 155Bb. The end coil 157a of each of the front and rear coil springs 157 in the direction of insertion is fitted on the associated spring mounting portion 155Bc and held in contact with the bottom of the associated spring receiving space 156 or the associated axial end surface of the large-diameter portion 155Ba. The other end of the coil spring 157 is held in contact with the associated axial end surface of the cylindrical body 153. Thus, the front and rear coil springs 157 apply respective biasing forces to the weight 155 toward each other.

With the dynamic vibration reducer 151 according to this embodiment, like the above-described first embodiment, this embodiment has the effect of realizing size reduction of the dynamic vibration reducer 151, while increasing its vibration reducing power. In addition, with the design in which the weight 155 is formed from two parts, or the cylindrical weight member 155A and the columnar weight member 155B, the cylindrical weight member 155A and the columnar weight member 155B can be individually manufactured, so that the manufacturing operation of the weight 155 can be made easier. Particularly, with the design in which the columnar weight member 155B is press-fitted into the cylindrical weight member 155A, the outer cylindrical weight member 155A can have a straight cylindrical shape, which is effective in increasing the productivity.

Further, with the design in which the cylindrical weight member 155A and the columnar weight member 155B are formed as separate members, the cylindrical weight member 155A and the columnar weight member 155B can be formed of different materials. As for the cylindrical weight member 155A located outside, in view of the fact that it slides along the inner wall of the cylindrical body 153, it can be formed of a material having high slidability (low friction) or having high wear resistance. As for the columnar weight member 155B disposed inside, with the primary objective of securing its weight for vibration reduction, it can be formed of a material having higher specific gravity than the cylindrical weight member 155A.

Third Embodiment of the Invention

Figure 5:
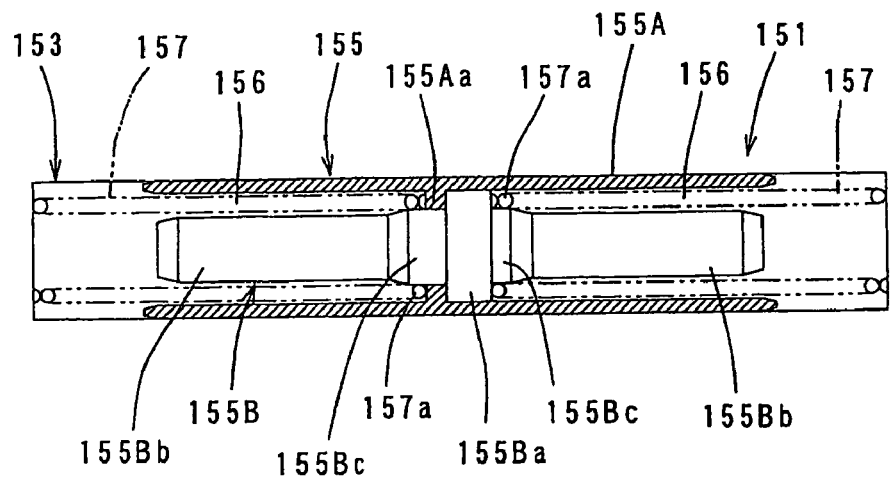
FIG. 5 is a sectional view showing a dynamic vibration reducer according to a third embodiment of this invention.

A third embodiment of the present invention is now described with reference to FIG. 5. The third embodiment is a modification to the above-described second embodiment. In this embodiment, in the dynamic vibration reducer 151, the cylindrical weight member 155A and the columnar weight member 155B housed within the cylindrical weight member 155A form the weight 155 and are integrally connected to each other by utilizing the biasing forces of the front and rear coil springs 157 which act on the cylindrical weight member 155A and the columnar weight member 155B toward each other. The cylindrical weight member 155A and the columnar weight member 155B are features that correspond to the "second part" and the "first part", respectively, according to this invention.

In this embodiment, a positioning stopper in the form of a flange 155Aa is formed on the inner surface of the cylindrical weight member 155A generally in the middle in the axial direction and protrudes radially inward. The columnar weight member 155B has the large-diameter portion 155Ba and the small-diameter portions 155Bb. The small-diameter portions 155Bb are integrally connected to the both axial ends of the large-diameter portion 155Ba and are longer in the axial direction than the large-diameter portion 155Ba. The columnar weight member 155B is loosely fitted (inserted) into the bore of the cylindrical weight member 155A. The end surface of the large-diameter portion 155Ba in the direction of insertion then contacts the flange 155Aa, so that the inserted columnar weight member 155B is positioned. As a result, the front and rear spring receiving spaces 156 each having an annular section and a longer axial length than the large-diameter portion 155Ba are defined between the outer surface of the small-diameter portions 155Bb and the inner surface of the cylindrical weight member 155A.

The coil springs 157 are inserted and received in the front and rear spring receiving spaces 156. The spring mounting portion 155Bc having a diameter equal to or slightly smaller than the inner diameter of the coil spring 157 is formed in the connection between the large-diameter portion 155Ba and the small-diameter portions 155Bb. The end coil 157a of the front (left as viewed in FIG. 5) coil spring 157 in the direction of insertion is fitted on the associated spring mounting portion 155Bc and held in contact with the associated axial end surface of the flange 155Aa, while the other end of the coil spring 157 is held in contact with the associated axial end surface of the cylindrical body 153. The end coil 157a of the rear (right as viewed in FIG. 5) coil spring 157 in the direction of insertion is fitted on the associated spring mounting portion 155Bc and held in contact with the bottom of the associated spring receiving space 156 or the associated axial end surface of the large-diameter portion 155Ba, while the other end of the coil spring 157 is held in contact with the associated axial end surface of the cylindrical body 153. Thus, the biasing forces of the front and rear coil springs 157 act toward each other upon the cylindrical weight member 155A and the columnar weight member 155B. The large-diameter portion 155Ba and the flange 155Aa are pushed against each other by the biasing forces of the front and rear coil springs 157 acting toward each other, so that the cylindrical weight member 155A and the columnar weight member 155B are integrally connected to each other. The large-diameter portion 155Ba and the flange 155Aa are features that correspond to the "connecting part" according to this invention.

The dynamic vibration reducer 151 according to this embodiment has the above-described construction. Therefore, like the above-described first embodiment, this embodiment has the effect of realizing size reduction of the dynamic vibration reducer 151, while increasing its vibration reducing power. In addition, like the above-described second embodiment, this embodiment has the effects that the cylindrical weight member 155A and the columnar weight member 155B can be individually manufactured and that the cylindrical weight member 155A and the columnar weight member 155B can be formed of different materials.

Particularly, according to this embodiment, the cylindrical weight member 155A and the columnar weight member 155B are integrally connected to each other by utilizing the biasing forces of the front and rear coil springs 157 acting toward each other. Specifically, the cylindrical weight member 155A and the columnar weight member 155B are engaged with each other via respective engagement surfaces formed in a direction transverse to the longitudinal direction (direction of movement), or the flange 155Aa and the large-diameter portion 155Ba. In this state, the engagement of the engagement surfaces are maintained by utilizing the biasing forces of the front and rear coil springs 157 acting toward each other. Therefore, the cylindrical weight member 155A and the columnar weight member 155B can be easily connected integrally to each other simply by assembling, without having to use a means for locking by press fitting.

Fourth Embodiment of the Invention

A fourth embodiment of the present invention is now described with reference to FIGS. 6 and 7. This embodiment is a modification to the arrangement of the spring receiving spaces 156 of the weight 155 in the dynamic vibration reducer 151 and is identical in construction to the above-described first embodiment except for the construction of the dynamic vibration reducer 151.

Figure 6:
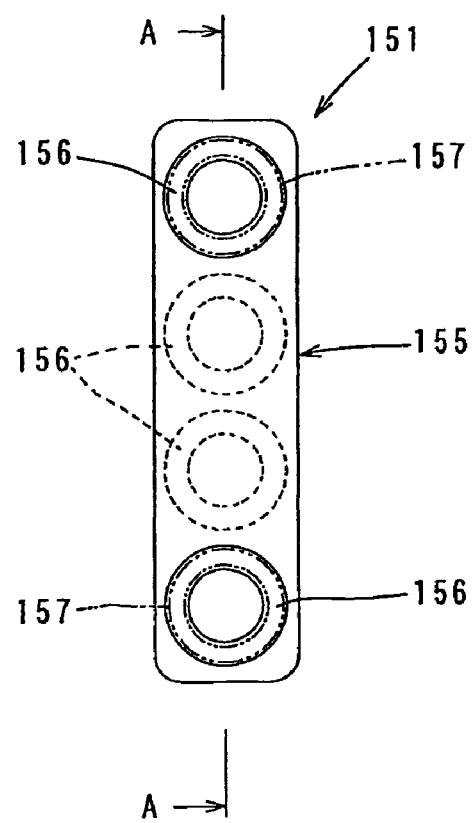
FIG. 6 is a front view showing a dynamic vibration reducer according to a fourth embodiment of this invention.
Figure 7:
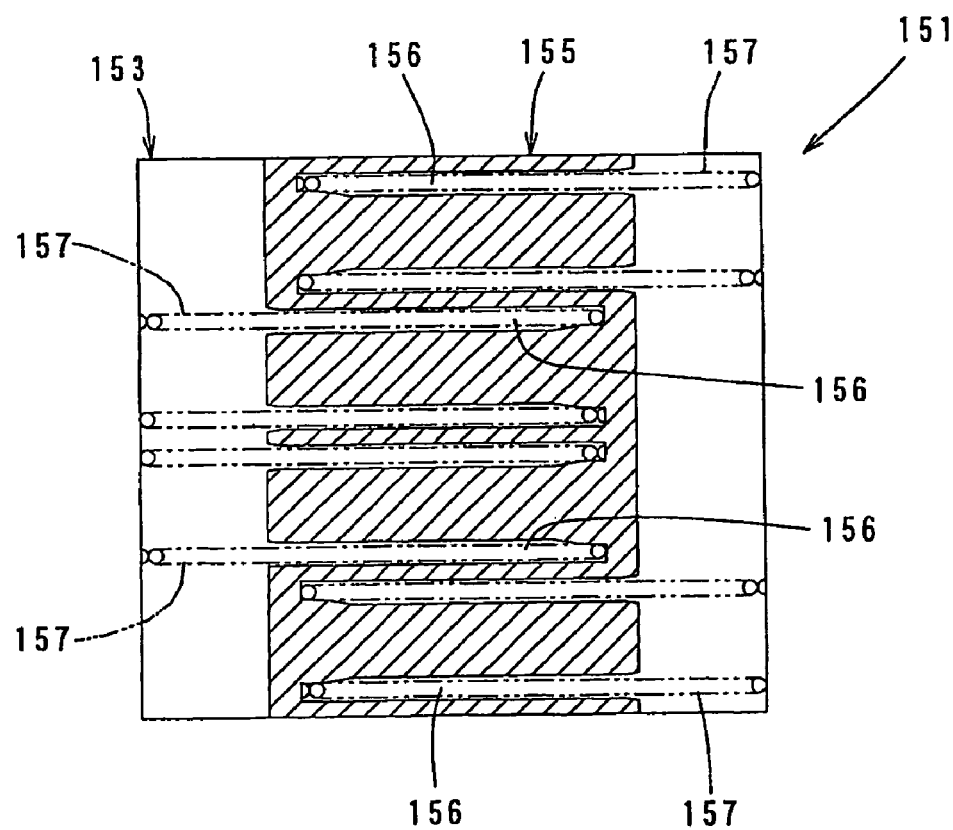
FIG. 7 is a sectional view taken along line A-A in FIG. 6.

As shown in FIGS. 6 and 7, in the dynamic vibration reducer 151 according to this embodiment, the weight 155 has a generally rectangular block-like shape which is long in the longitudinal and vertical directions. Four spring receiving spaces 156 (two each on the front and rear sides) each having an annular section and extending in the longitudinal direction of the weight 155 (the axial direction of the hammer bit 119) are formed one above the other in parallel in the weight 155. The rear spring receiving spaces 156 are open at the axial rear end (right end as viewed in FIG. 7) of the weight 155 and extend forward from the open end and are disposed in the upper and lower portions of the weight 155. The front spring receiving spaces 156 are open at the axial front end (left end as viewed in FIG. 7) of the weight 155 and extend rearward from the open end and are disposed in the middle portion of the weight 155 in the vertical direction. The coil springs 157 are received in the front and rear spring receiving spaces 156. The front spring receiving spaces 156 and the rear spring receiving spaces 156 are features that correspond to the "first internal space" and the "second internal space", respectively, according to this invention.

As described above, in this embodiment, the front and rear spring receiving spaces 156 for receiving the coil springs 157 are formed in the weight 155 and arranged to overlap each other when viewed from a direction transverse to the longitudinal direction of the weight 155 (in the vertical direction). With this construction, the length of the weight 155 in the longitudinal direction can be further reduced compared with the above-described embodiments, so that the dynamic vibration reducer 151 can be further reduced in size in its longitudinal direction. Thus, this construction is particularly effective when installation space for the dynamic vibration reducer 151 in the body 103 is limited in the longitudinal direction of the body 103. Further, the front spring receiving spaces 156 are disposed in the middle of the weight 155 in the vertical direction and between the rear spring receiving spaces 156 disposed above and below the front spring receiving spaces 156. With this arrangement, the biasing forces of the front and rear coil springs 157 acting upon the weight 155 can be balanced in the direction of movement of the weight 155. As a result, useless vibration (couple) can be prevented from being generated by movement of the weight 155, so that the movement of the weight 155 can be stabilized.

Fifth Embodiment of the Invention

Figure 8:
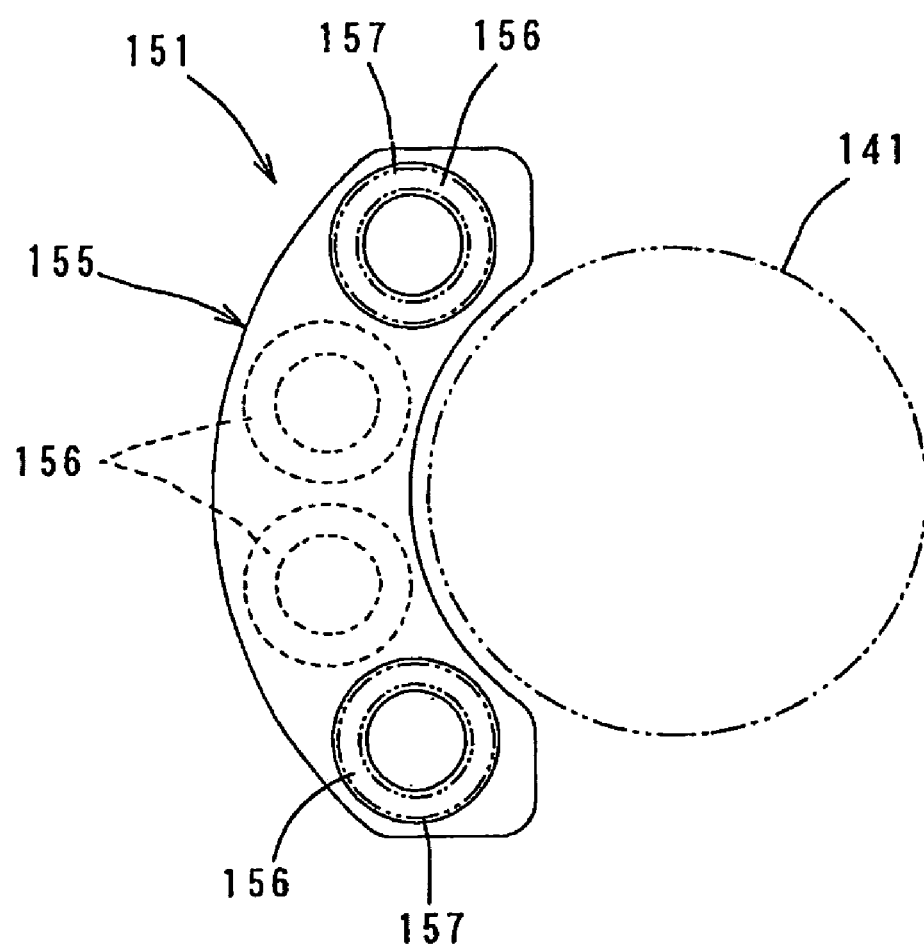
FIG. 8 is a front view showing a dynamic vibration reducer according to a fifth embodiment of this invention and its placement.

A fifth embodiment of the present invention is now described with reference to FIG. 8. This embodiment is a modification to the above-described fourth embodiment. In this embodiment, as shown in FIG. 8, the dynamic vibration reducer 151 is formed based on the construction in which the front and rear spring receiving spaces 156 are arranged in the weight 155 in such a manner as to overlap each other when viewed from a direction transverse to the longitudinal direction of the weight 155. Further, the outside shape of the weight 155 of the dynamic vibration reducer 151 is configured to have a semicircular shape (generally semi-ring shape as viewed from the hammer bit 119 side) which conforms to the shape (curved surface) of the outer periphery of the cylindrical cylinder 141. Thus the dynamic vibration reducer 151 is disposed along the outer periphery of the cylinder 141. Further, like the above-mentioned embodiments, the front and rear spring receiving spaces 156 are annular in section. The front spring receiving spaces 156 and the rear spring receiving spaces 156 are features that correspond to the "first internal space" and the "second internal space", respectively, according to this invention.

According to this embodiment having the above-described construction, the dynamic vibration reducer 151 can be further reduced in height in the vertical direction compared with the above-described fourth embodiment, while being further reduced in size in its longitudinal direction. Further, the arrangement of the dynamic vibration reducer 151 along the outer periphery of the cylinder 141 (or a barrel part that houses the cylinder 141) can eliminate or minimize dead space which may be created around the dynamic vibration reducer 151, so that the body 103 can be reduced in size in a more rational and effective manner. Further, in this case, in which the dynamic vibration reducer 151 is arranged along the outer periphery of the cylinder 141 (or the barrel part that houses the cylinder 141), although, in FIG. 8, the dynamic vibration reducer 151 is shown disposed only on one side of the cylinder for the sake of expediency, a pair of the dynamic vibration reducers 151 are preferably disposed on the both sides of the cylinder as shown in FIG. 2 in order to prevent useless vibration (couple) from being generated by actuation of the dynamic vibration reducers 151.

Sixth Embodiment of the Invention

Figure 9:
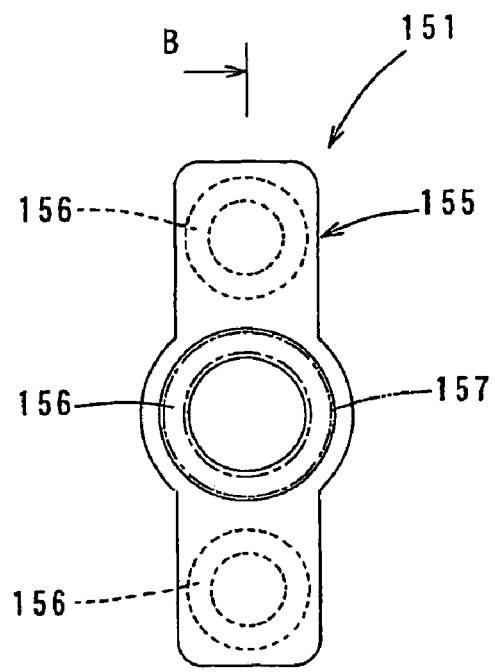
FIG. 9 is a front view showing a dynamic vibration reducer according to a sixth embodiment of this invention.
Figure 10:
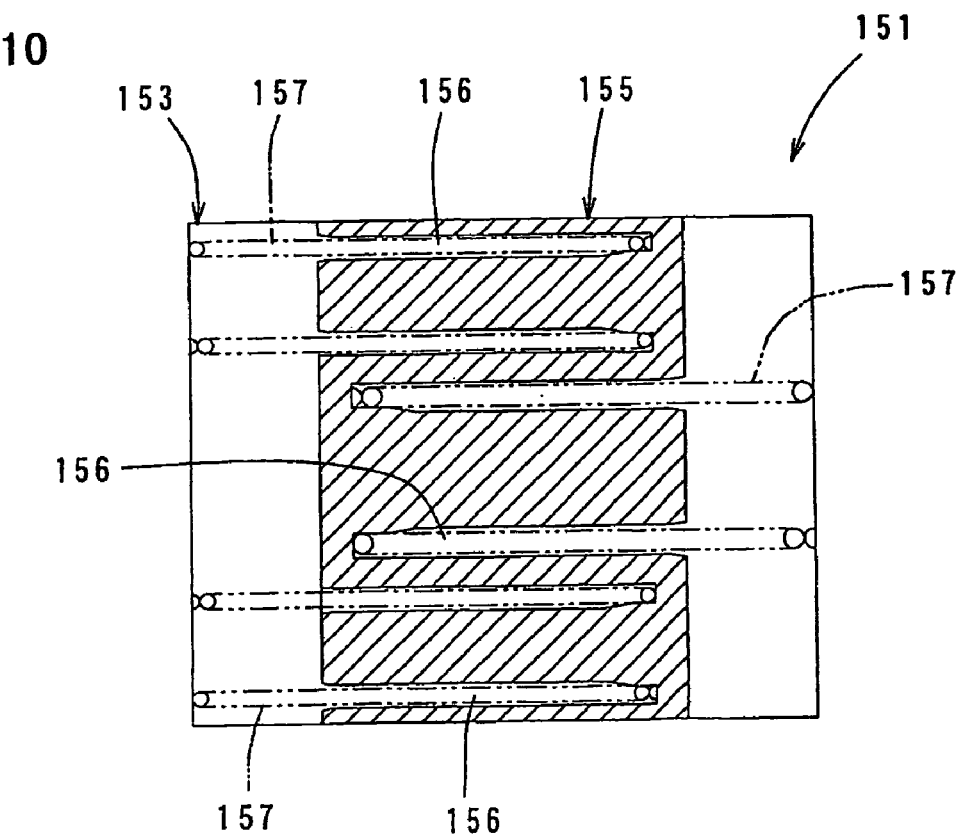
FIG. 10 is a sectional view taken along line B-B in FIG. 9.

A sixth embodiment of the present invention is now described with reference to FIGS. 9 and 10. This embodiment is a modification to the above-described fourth embodiment. In this embodiment, as shown in FIGS. 9 and 10, the dynamic vibration reducer 151 is formed based on the construction in which the front and rear spring receiving spaces 156 are arranged in the weight 155 in such a manner as to overlap each other when viewed from the vertical direction. Further, the coil spring 157 assigned to the front spring receiving space 156 has a different spring constant from the coil spring 157 assigned to the rear spring receiving space 156, so that the number of the coil springs 157 to be used can be reduced. The front spring receiving spaces 156 and the rear spring receiving space 156 are features that correspond to the "first internal space" and the "second internal space", respectively, according to this invention.

In this embodiment, the weight 155 has a generally rectangular block-like shape. One rear spring receiving space 156 and two front spring receiving spaces 156 are formed one above the other in parallel in the weight 155. Like in the above-mentioned embodiments, the front and rear spring receiving spaces 156 have an annular section. The rear spring receiving space 156 is disposed in the middle of the weight 155 in the vertical direction and between the two front spring receiving spaces 156 disposed in the upper and lower portions of the weight 155. The coil springs 157 are received in the front and rear spring receiving spaces 156. The rear coil spring 157 has a larger spring constant than the front coil springs 157. Specifically, the spring constants of the front and rear coil springs 157 are determined such that the biasing forces of the front and rear coil springs 157 acting upon the weight 155 are balanced with respect to each other. Further, the two front spring receiving spaces 156 have the same spring constant.

According to this embodiment having the above-described construction, the number of the coil springs 157 on one side (the rear side in this embodiment) can be reduced while the balance between the biasing forces of the two front coil springs 157 and the biasing force of the rear coil spring 157 are maintained. As a result, the dynamic vibration reducer 151 (the weight 155) can be further reduced in height in the vertical direction compared with the above-described fourth embodiment, while being further reduced in size in its longitudinal direction. Thus, the dynamic vibration reducer 151 can be further reduced in size.

In the above-described fourth to sixth embodiments, the direction in which the spring receiving spaces 156 are viewed as overlapping each other is described as the vertical direction, which is based on the assumption that the dynamic vibration reducer 151 is installed in a vertical position. Therefore, if the dynamic vibration reducer 151 is installed in a horizontal position, the spring receiving spaces 156 overlap each other when viewed from the horizontal direction.

Seventh Embodiment of the Invention

A seventh embodiment of the present invention is now described with reference to FIGS. 11 and 12. In this embodiment, the dynamic vibration reducer 151 is arranged to surround the outer periphery of the cylinder 141 (or the barrel part that houses the cylinder 141), and the front and rear spring receiving spaces 156 are arranged in the weight 155 in such a manner as to overlap each other when viewed from the circumferential direction transverse to the longitudinal direction of the weight 155.

Figure 11:
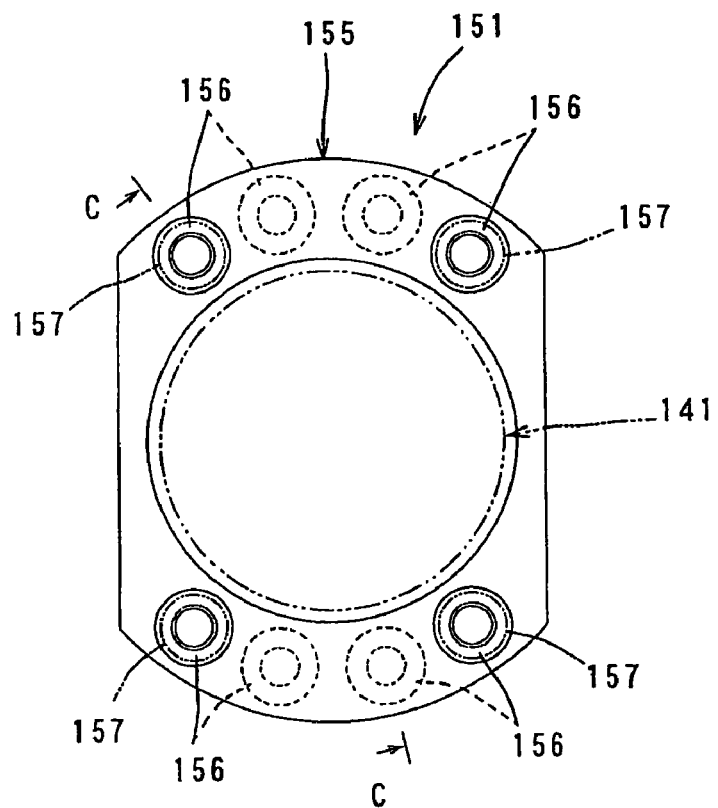
FIG. 11 is a front view showing a dynamic vibration reducer according to a seventh embodiment of this invention.
Figure 12:
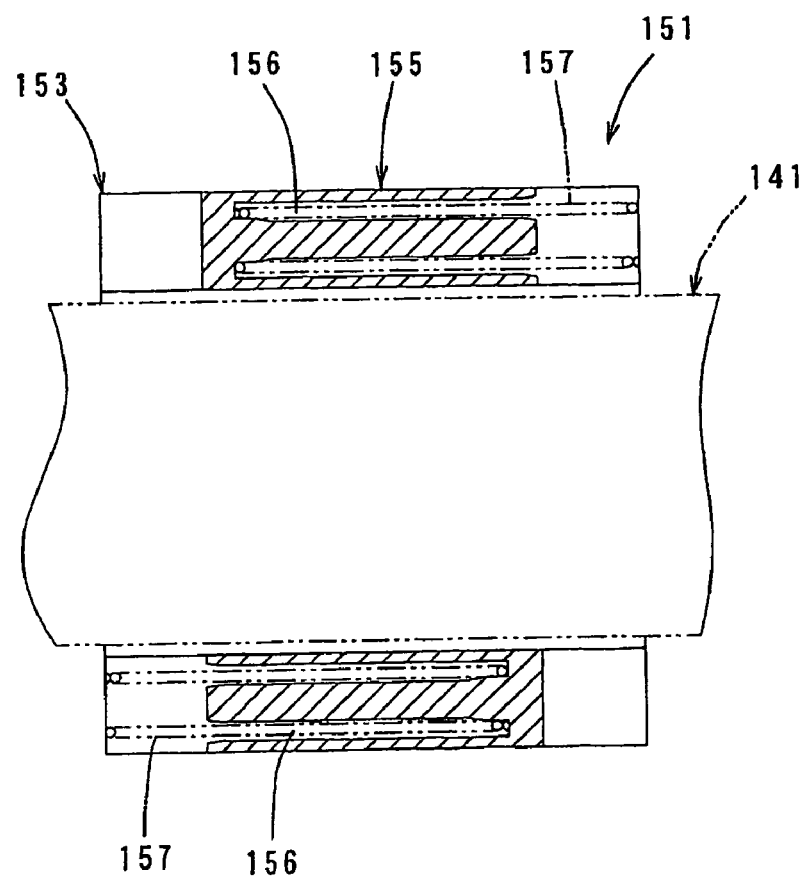
FIG. 12 is a sectional view taken along line C-C in FIG. 11.

Specifically, as shown in FIGS. 11 and 12, the weight 155 has a generally ring-like shape when viewed from the hammer bit 119 side (from the front). The front and rear spring receiving spaces 156 are formed in parallel in the weight 155 and arranged in such a manner as to overlap each other in the circumferential direction of the weight 155. The coil springs 157 are received in the spring receiving spaces 156. Like in the above-mentioned embodiments, the front and rear spring receiving spaces 156 have an annular section. Further, in this embodiment, four front spring receiving spaces 156 and four rear spring receiving spaces 156 are shown provided, but they may be appropriately increased or reduced in number. The front spring receiving spaces 156 and the rear spring receiving space 156 are features that correspond to the "first internal space" and the "second internal space", respectively, according to this invention.

According to this embodiment, with the construction in which the dynamic vibration reducer 151 is arranged (installed) to surround the outer periphery of the cylinder 141 (or the barrel part that houses the cylinder 141), rational arrangement can be realized which can eliminate or minimize dead space around the dynamic vibration reducer 151. Further, with the construction in which the weight 155 has a generally ring-like shape and the front and rear spring receiving spaces 156 are arranged to overlap each other in the circumferential direction of the weight 155, the weight 155 can be reduced in axial length, so that the dynamic vibration reducer 151 can be reduced in axial length.

Eighth Embodiment of the Invention

Figure 13:
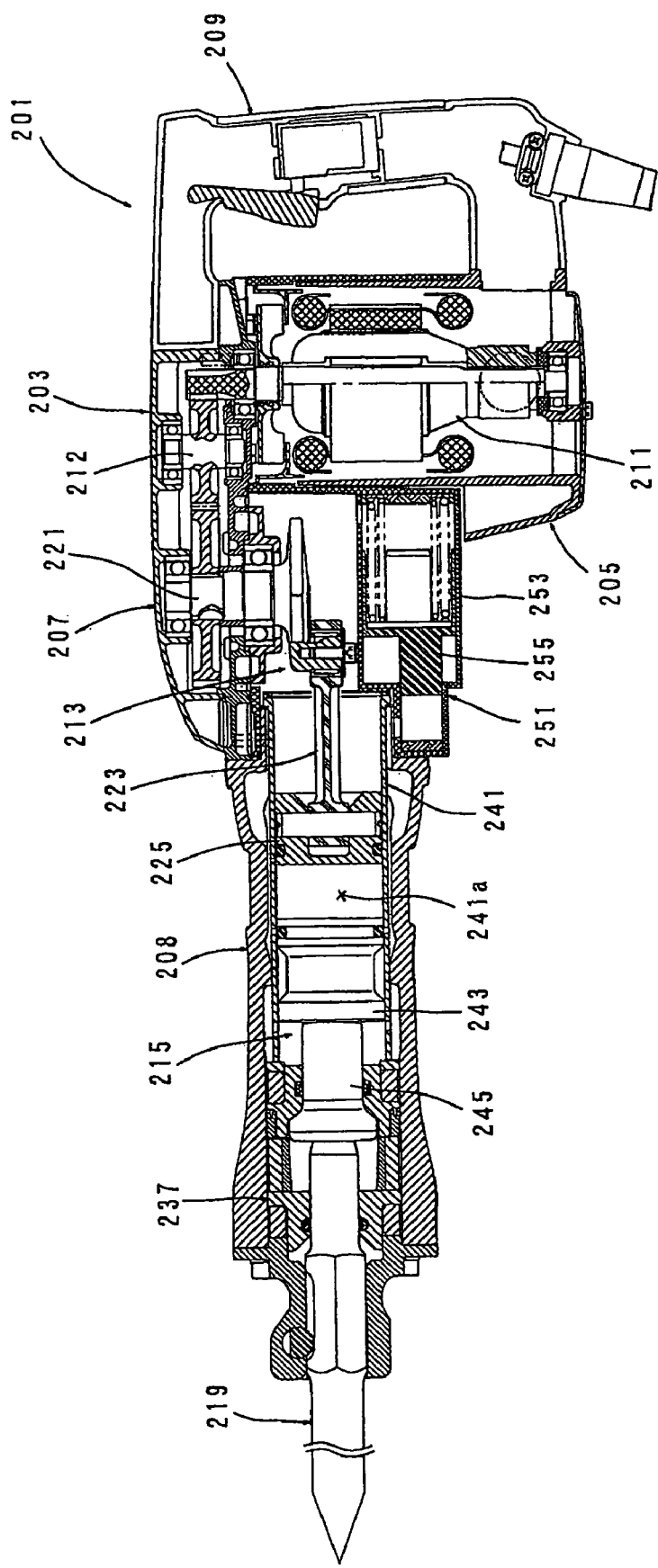
FIG. 13 is a sectional side view showing an entire electric hammer according to an eighth embodiment of this invention.
Figure 14:
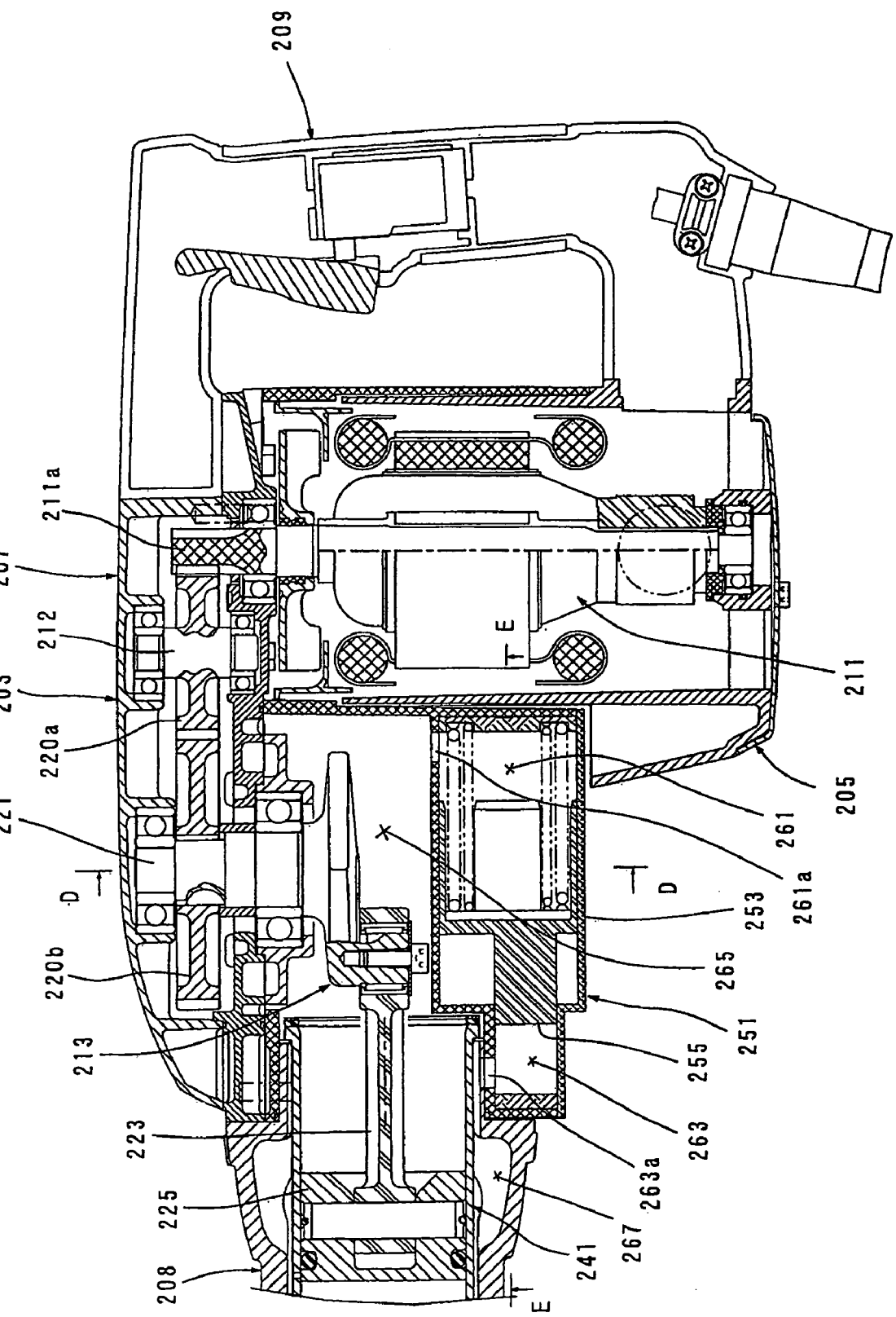
FIG. 14 is an enlarged sectional view showing part of the electric hammer.

An eighth embodiment of the present invention is now described with reference to FIGS. 13 to 16. This embodiment is applied to an electric hammer 201 as a representative example of a large power tool of the type in which a driving motor 211 is disposed on a handgrip 209 side of a crank shaft 221. FIG. 13 is a sectional side view showing the entire electric hammer 201, and FIG. 14 is an enlarged sectional view showing part of the hammer. As shown in FIGS. 13 and 14, a body 203 forms an outer shell of the hammer 201 and mainly includes a motor housing 205 that houses a driving motor 211, a gear housing 207 that houses a motion converting mechanism 213, and a barrel part 208 that houses a striking mechanism 215. The gear housing 207 is connected to the front upper region of the motor housing 205. The barrel part 208 is connected to the front end of the gear housing 207 and extends forward on the axis of the hammer bit 219. Further, the handgrip 209 is disposed rearward of the motor housing 205, with its upper end connected to the rear end of the gear housing 207 and its lower end connected to the rear end of the motor housing 205.

The driving motor 211 is disposed on the axis of the hammer bit 219 such that its axis of rotation intersects with the axis of the hammer bit 219 or runs vertically. The motion converting mechanism 213 converts rotation of the driving motor 211 into linear motion and transmits it to the striking element 215. The motion converting mechanism 213 is housed in the upper region of the internal space of the gear housing 207.

Like in the above-described first embodiment, the motion converting mechanism 213 forms a crank mechanism that includes a crank shaft 221 driven by the driving motor 211, a crank arm 223 connected to the crank shaft 221 via an eccentric pin, and a piston 225 which is reciprocated by the crank arm 223. The crank shaft 221 is rotationally driven via two gears 220a, 220b for speed reduction by the driving motor 211. The one gear 220a is mounted onto an intermediate shaft 212 disposed between the crank shaft 221 and a motor shaft 211a, while the other gear 220b is mounted onto the crank shaft 221. The crank mechanism and the gears 220a, 220b form the "driving mechanism part" according to this invention.

Like in the above-described first embodiment, the striking mechanism 215 includes a striking element in the form of a striker 243 that is slidably disposed within the bore of the cylinder 241, and an intermediate element in the form of an impact bolt 245 that is slidably disposed within the tool holder 237 and transmits the kinetic energy of the striker 243 to the hammer bit 219. An air chamber 241a is defined between the piston 225 and the striker 243 within the cylinder 241. The striker 243 is driven via the action of an air spring of the air chamber 241a of the cylinder 241 which is caused by sliding movement of the piston 225. The striker 243 then collides with (strikes) the intermediate element in the form of the impact bolt 245 that is slidably disposed within the tool holder 237, and transmits the striking force to the hammer bit 219 via the impact bolt 245.

In the case of the large electric hammer 201 of the type in which the driving motor 211 is disposed on the axis of the hammer bit 219, in the construction as described above in which the driving mechanism part for converting rotation of the driving motor 211 into linear motion and driving the hammer bit 219 is disposed in the upper region of the gear housing 207, free space exists in the lower region (the underside region extending transverse to the front surface of the motor housing 205) of the gear housing 207. In this embodiment, a dynamic vibration reducer 251 is disposed by utilizing this free space.

When the dynamic vibration reducer 251 is designed to be placed as close as possible to the axis of the hammer bit 219 within the above-mentioned free space, it has to be considered that the space is limited in the longitudinal length (in the axial direction of the hammer bit 219) and particularly its front part is limited having a vertically stepped part. Therefore, in this embodiment, the dynamic vibration reducer 251 is reduced in longitudinal length so as to be disposed in the above-described free space. The construction of the dynamic vibration reducer 251 is now described below.

Figure 15:
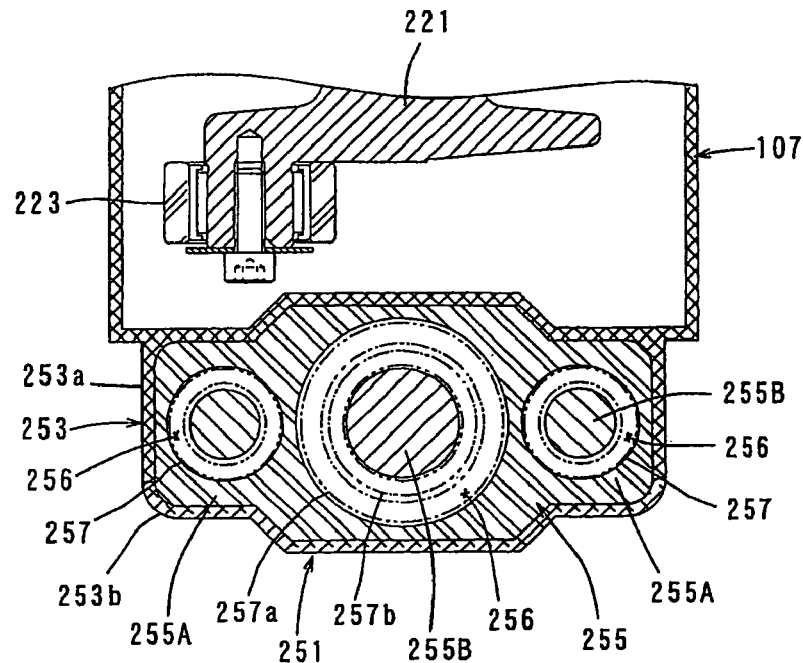
FIG. 15 is a sectional view taken along line D-D in FIG. 14.
Figure 16:
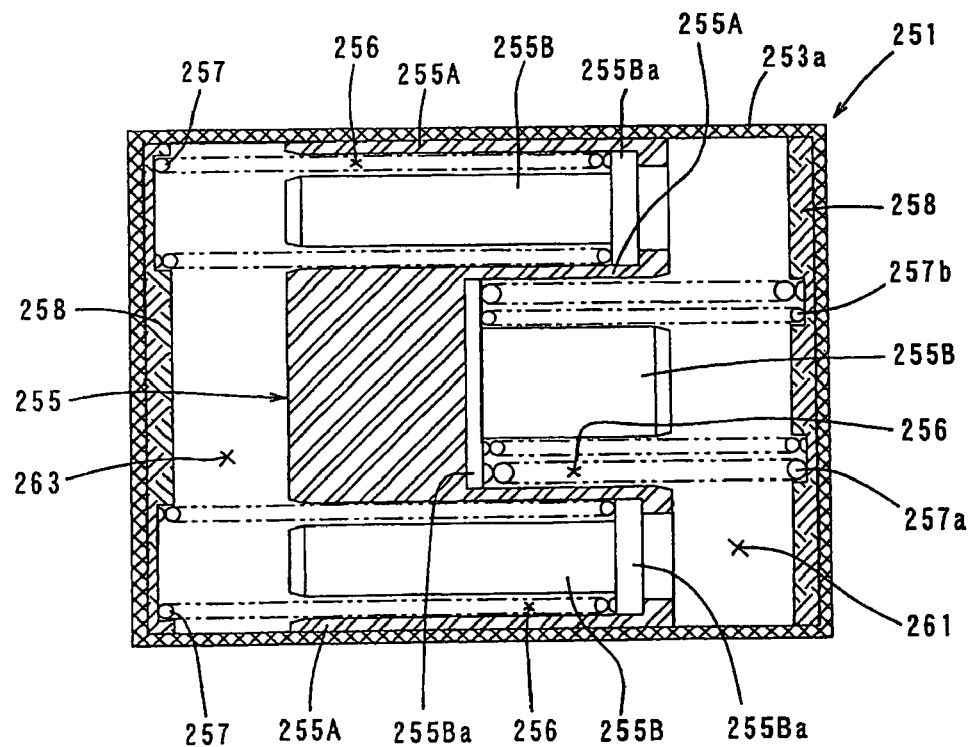
FIG. 16 is a sectional view taken along line E-E in FIG. 14.

As shown in FIGS. 15 and 16, the weight 255 of the dynamic vibration reducer 251 according to this embodiment has a generally rectangular block-like shape which is long in horizontal directions (in the longitudinal and lateral directions). The weight 255 is disposed within a cylindrical body 253 and can slide in the longitudinal direction, or in the axial direction of the hammer bit 219. The cylindrical body 253 is configured such that its upper and lower inner wall surfaces and side inner wall surfaces conform to the outer shape of the weight 255, and the weight 255 can slide in contact with the inner wall surfaces of the cylindrical body 253. The cylindrical body 253 is integrally formed on the lower end of the gear housing 207 and includes a case part 253a having an open bottom and a cover part 253b removably attached to the case part 253a so as to cover the opening.

One rear spring receiving space 256 and two front spring receiving spaces 256 are formed side by side in parallel in the weight 255. Each of the front and rear spring receiving spaces 256 is defined by an outer weight member 255A and a columnar weight member 255B and has an annular section. The outer weight member 255A has a bore of a circular section with a bottom, and the columnar weight member 255B has a smaller diameter than the bore of the outer weight member 255A and coaxially disposed within the bore. The columnar weight member 255B has a flange 255Ba on one axial end, and the flange 255Ba is press-fitted into the bore of the outer weight member 255A so that the columnar weight member 255B is connected to the outer weight member 255A. The rear spring receiving space 256 has an open rear end and extends forward from the rear end. The two front spring receiving spaces 256 each have an open front end and extend rearward from the front end. The rear spring receiving space 256 is formed in the middle of the weight 255 in the lateral direction. The front spring receiving spaces 256 are formed in the right and left portions of the weight 255 on the both sides of the rear spring receiving space 256.

A coil spring 257 is disposed in each of the front spring receiving spaces 256. Two coil springs 257a, 257b having diameters different from each other and larger than the front coil spring 257 are coaxially disposed radially inward and outward in the rear spring receiving space 256. The outer coil spring 257a has a larger wire diameter than the inner coil spring 257b. The spring constants of the two front coil springs 257 and the spring constants of the two rear coil springs 257a, 257b are determined such that the biasing forces of the two front coil springs 257 and the biasing forces of the two rear coil springs 257 acting upon the weight 255 are balanced with respect to each other. Further, each of the coil springs 257, 257a, 257b is elastically disposed between a spring receiver 258 disposed in the cylindrical body 253 and the flange 255Ba of the columnar weight member 255B. The dynamic vibration reducer 251 having the above-described construction is disposed such that the axis or center of the rear spring receiving space 256 is located right below the axis of the hammer bit 219.

With the dynamic vibration reducer 251 having the above-described construction according to this embodiment, in which the two coil springs 257a, 257b having diameters different from each other and larger than the front coil spring 257 are coaxially disposed radially inward and outward in the rear spring receiving space 256, the length of the rear coil springs 257a, 257b can be shortened compared with the construction in which a single rear coil spring is disposed in place of the two coil springs. Therefore, the dynamic vibration reducer 251 can be reduced in longitudinal length (in the axial direction of the hammer bit 219) while ensuring the space in which the weight 255 can move in the longitudinal direction. Thus, the dynamic vibration reducer 251 can be disposed close to the axis of the hammer bit 219 in the above-described free space which is limited in the longitudinal length in the lower region of the gear housing 207.

Particularly in this embodiment, due to the positional relationship with the cylinder 241, the free space in which the dynamic vibration reducer 251 can be disposed has a front region which is stepped and limited in the vertical direction. Therefore, by providing the two coil springs 257a, 257b in the rear spring receiving space 256, the front portion of the weight 255 without the rear spring receiving space 256 can be reduced in thickness in the vertical direction. Thus, the dynamic vibration reducer 251 can be rationally disposed in the stepped free space. Specifically, as shown in FIGS. 14 and 15, the dynamic vibration reducer 251 is disposed right below the axis of the hammer bit 219 such that its front region of the top central portion in the lateral direction is located underneath the cylinder 241 and its rear region of the top central portion is located in an upper position closer to the axis of the hammer bit 219 than the lower portion of the cylinder 241. Thus, the dynamic vibration reducer 251 can be installed by effectively utilizing the free space.

Further, in the dynamic vibration reducer 251 according to this embodiment, the three spring receiving spaces 256 formed in the weight 255 are arranged on the same plane. Therefore, the points of action of the coil springs 257, 257a, 257b received in the respective spring receiving spaces 256 are located on the same plane. With this construction, unnecessary vibration can be prevented from being caused in the dynamic vibration reducer 251 itself by imbalance of couple.

Further, with the construction in which the dynamic vibration reducer 251 is disposed in the lower region of the gear housing 207, the dynamic vibration reducer 251 and the motion converting mechanism 213 are opposed to each other on opposite sides of the axis of the hammer bit 219. Therefore, the balance of the power tool can be easily achieved in the vertical direction.

As shown in FIGS. 13 and 14, like in the above-described first embodiment, the dynamic vibration reducer 251 has a first actuation chamber 261 on the rear side of the weight 255 and a second actuation chamber 263 on the front side of the weight 255 within the cylindrical body 253. The first actuation chamber 261 on the rear side communicates with a hermetic crank chamber 265 that is normally in noncommunication with the outside, via a first communication part 261a. The second actuation chamber 263 on the front side communicates with a cylinder receiving space 267 of the gear housing 207 via a second communication part 263a. Therefore, like in the first embodiment, the dynamic vibration reducer 251 not only has the passive vibration reducing function but also serves as an active vibration reducing mechanism by forced vibration in which the weight 255 is actively driven. Thus, vibration caused in the body 203 during hammering operation can be further effectively reduced.

Further, in the above-described embodiments, the hammer drill 101 and the electric hammer 201 are described as representative examples of the power tool. However, the present invention can also be applied to power tools which perform an operation upon a workpiece by linearly moving the tool bit, for example, suitably including a jig saw and a reciprocating saw which perform a cutting operation on a workpiece by reciprocating a saw blade.

Further, in the dynamic vibration reducer 151 of the fourth to seventh embodiments, like in the second embodiment, the weight 155 can be formed by separate members, or the cylindrical weight member 155A and the columnar weight member 155B, and they may be integrally connected via a press-fitting construction or a biasing construction in which the biasing forces of the coil springs 157 act toward each other upon the weight 155. Further, the spring receiving spaces 156 are described as having an annular section, but they may have a circular hollow shape or other hollow shape.

DESCRIPTION OF NUMERALS 101 hammer drill (power tool)
103 body (tool body)
105 motor housing
107 gear housing
109 handgrip
111 driving motor
113 motion converting mechanism
115 striking mechanism
117 power transmitting mechanism
119 hammer bit (tool bit)
121 crank shaft
123 crank arm
125 piston
131 intermediate gear 133 small bevel gear
135 large bevel gear
137 tool holder
141 cylinder
141a air chamber
143 striker
145 impact bolt
151 dynamic vibration reducer
153 cylindrical body (cylindrical guide)
155 weight
155A cylindrical weight member (second part)
155B columnar weight member (first part)
155Aa flange
155Ba large-diameter portion
155Bb small-diameter portion
155Bc spring mounting portion
155a cylindrical portion
155b columnar portion
155c spring mounting portion
156 spring receiving space (internal space)
157 coil spring (elastic element)
157a end coil
161 first actuation chamber
161a first communication part
163 second actuation chamber
163a second communication part
165 crank chamber
167 cylinder receiving space
201 electric hammer (power tool)
203 body (tool body)
205 motor housing
207 gear housing
209 handgrip
211 driving motor
211a motor shaft
212 intermediate shaft
213 motion converting mechanism
215 striking mechanism
219 hammer bit (tool bit)
220a, 220b gear
221 crank shaft
223 crank arm
225 piston
237 tool holder
241 cylinder
241a air chamber
243 striker
245 impact bolt
251 dynamic vibration reducer
253 cylindrical body (cylindrical guide)
253a case part
253b cover part
255 weight
255A outer weight member (second part)
255B columnar weight member (first part)
255Ba flange
256 spring receiving space (internal space)
257 coil spring (elastic element)
257a, 257b coil spring (elastic element)
258 spring receiver
261 first actuation chamber
261a first communication part
263 second actuation chamber
263a second communication part
265 crank chamber
267 cylinder receiving space

What is claimed is:

1. A power tool which linearly drives a tool bit to perform a predetermined operation on a workpiece comprising:
    a tool body, and
    a dynamic vibration reducer having a weight mounted directly or via a body side member to the tool body to linearly move in an axial direction of the tool bit, and an elastic element that elastically supports the weight on the tool body directly or via the body side member, wherein the dynamic vibration reducer reduces vibration of the tool body during hammering operation by the linear movement of the weight, wherein:
    the weight defines an internal space that extends at least partially within itself in the axial direction of the tool bit from at least one end of the weight in said axial direction, and
    one end of the elastic element is inserted and received in the internal space, while the other end of the elastic element is placed on the tool body directly or via the body side member.

2. The power tool as defined in claim 1, wherein the weight includes a first part and a second part respectively extending in the axial direction of the tool bit, a connecting part that connects the second part with the first part, and a space enclosed by the first and second parts and the connecting part, wherein the space defines the internal space, and wherein the first part and the second part are formed by separate members.

3. The power tool as defined in claim 2, wherein the first part and the second part are formed of different materials.

4. The power tool as defined in claim 2, wherein the first part is press-fitted into the second part and thereby integrally connected to the second part.

5. The power tool as defined in claim 2, wherein the first part is loosely fitted into the second part, and the first part and the second part are engaged with each other via respective engagement surfaces formed in a direction transverse to the direction of insertion of the first part, and in the state of engagement, the first part and the second part are integrally connected to each other by biasing forces of a plurality of elastic elements acting toward each other upon the first part and the second part.

6. The power tool as defined in claim 1, wherein the weight has a first internal space extending from one end toward the other end of the weight in the axial direction of the tool bit, and a second internal space extending from the other end toward the one end in the axial direction of the tool bit, and the first internal space and the second internal space are arranged to overlap each other when viewed from a direction transverse to the extending direction.

7. The power tool as defined in claim 1, further comprising:
    a driving motor disposed on the axis of the tool bit within the tool body such that its axis of rotation intersects with the axis of the tool bit, and
    a driving mechanism part that is disposed within the tool body and serves to convert rotating output of the driving motor into linear motion and drive the tool bit at least linearly in the axial direction,
    wherein the dynamic vibration reducer and the driving mechanism part are opposed to each other on opposite sides of the axis of the tool bit.

8. The power tool as defined in claim 1, wherein the elastic element comprises coil springs, each coil spring is coaxially disposed in the internal space of the weight.

9. The power tool as defined in claim 8, wherein each coil spring has a different diameter to each other.

10. The power tool as defined in claim 1, wherein the weight has at least three internal spaces which are all disposed on the same plane.

* * * * *